United States Patent
Richter et al.

[11] Patent Number: 5,858,097
[45] Date of Patent: Jan. 12, 1999

[54] APPARATUS FOR THE PRODUCTION OF A MAGNETIC RECORDING MEDIUM

[75] Inventors: Volker Richter, Heidelberg; Peter Nagel, Willstätt; Hans-Günter Wagner, Neuleiningen; Werner Lenz, Bad Dürkheim; Norbert Gilbert, Niederkirchen, all of Germany

[73] Assignee: Emtec Magnetics GmbH, Ludwigshafen, Germany

[21] Appl. No.: 601,778

[22] Filed: Feb. 15, 1996

[30] Foreign Application Priority Data

Feb. 15, 1995 [DE] Germany ............ 195 04 930.6

[51] Int. Cl.$^6$ ............................................. B05C 0/02
[52] U.S. Cl. ........................... 118/411; 118/419
[58] Field of Search ................... 118/410, 411, 118/419; 425/461

[56] References Cited

U.S. PATENT DOCUMENTS

| | | | |
|---|---|---|---|
| 3,413,143 | 11/1968 | Cameron et al. | 118/411 |
| 4,675,230 | 6/1987 | Innes | 118/411 |
| 4,854,262 | 8/1989 | Chino et al. | 118/411 |
| 4,863,793 | 9/1989 | Ogawa et al. | 428/323 |
| 4,982,687 | 1/1991 | Takahashi et al. | 118/410 |
| 4,994,306 | 2/1991 | Takahashi et al. | 427/131 |
| 5,069,934 | 12/1991 | Chino et al. | 427/131 |
| 5,072,688 | 12/1991 | Chino et al. | 118/411 |
| 5,202,164 | 4/1993 | Takahashi et al. | 427/356 |
| 5,209,954 | 5/1993 | Takahashi et al. | 118/410 |
| 5,250,320 | 10/1993 | Suzuki et al. | 427/128 |
| 5,304,393 | 4/1994 | Shibata et al. | 427/130 |
| 5,336,322 | 8/1994 | Tobisawa et al. | 118/410 |
| 5,348,768 | 9/1994 | Shibata et al. | 427/356 |
| 5,384,162 | 1/1995 | Takahashi et al. | 427/356 |
| 5,397,600 | 3/1995 | Shibata et al. | 427/358 |
| 5,422,137 | 6/1995 | Huebler et al. | 427/122 |
| 5,424,100 | 6/1995 | Takahashi et al. | 427/402 |
| 5,425,967 | 6/1995 | Tomaru | 118/411 |
| 5,456,944 | 10/1995 | Trest et al. | 427/128 |
| 5,466,542 | 11/1995 | Kraetschmer et al. | 428/694 |
| 5,582,645 | 12/1996 | Trest et al. | 118/410 |
| 5,614,023 | 3/1997 | Takahashi et al. | 118/410 |

FOREIGN PATENT DOCUMENTS

| | | |
|---|---|---|
| 566 124 | 10/1993 | European Pat. Off. . |
| 1029017 | 4/1964 | United Kingdom . |
| 1229816 | 4/1971 | United Kingdom ............ 118/411 |
| 93/02017 | 2/1993 | WIPO . |

*Primary Examiner*—Brenda A. Lamb
*Attorney, Agent, or Firm*—Keil & Weinkauf

[57] ABSTRACT

A knife coater for the application of one or more magnetizable dispersions located one on top of the other to a moving flexible substrate by means of a plurality of coater slots which are arranged essentially horizontally and parallel to one another in a multipart block and are fed from reservoirs is described, the outlet orifices of the coater slots being essentially opposite the summit of a concave support surface for the substrate, the substrate transporting the applied layers, the outlet surfaces of the coater block which are opposite the support surface being adapted to the radius of the roll and the inflow gap being larger than the outflow gap.

5 Claims, 4 Drawing Sheets

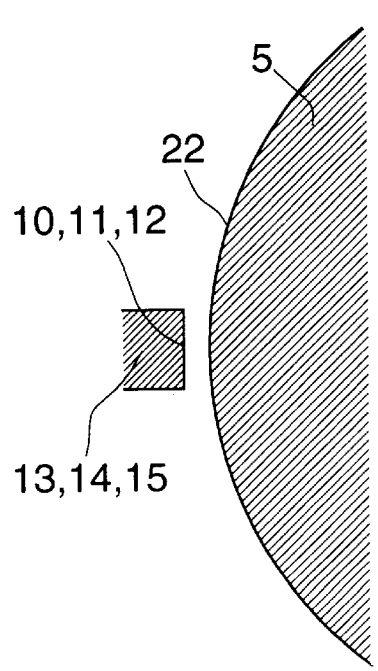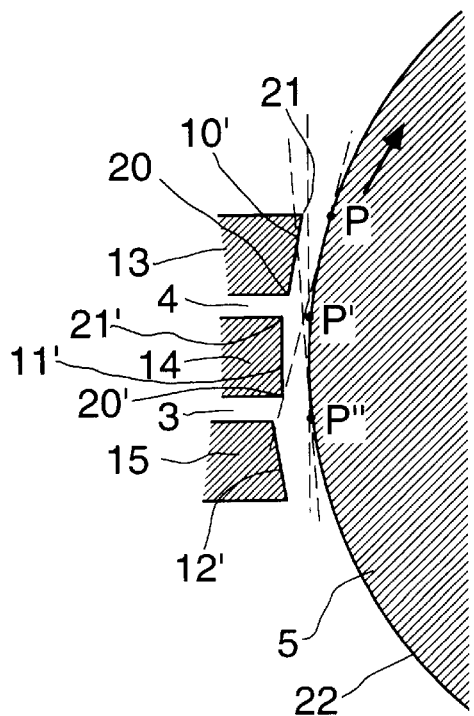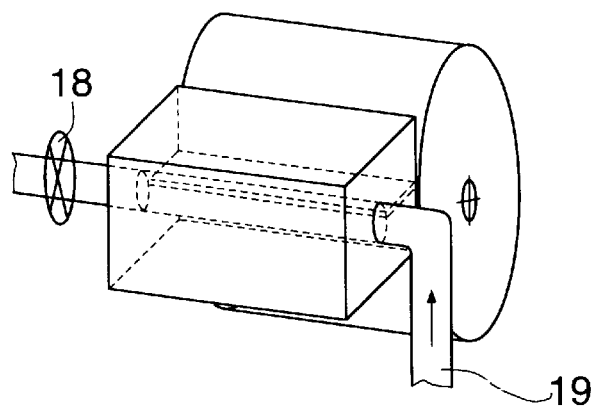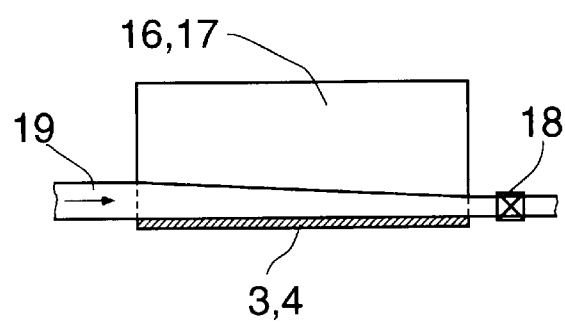

APPARATUS FOR THE PRODUCTION OF A MAGNETIC RECORDING MEDIUM

BACKGROUND OF THE INVENTION

The present invention relates to an apparatus for applying a plurality of layers, which are located one on top of the other and at least one of which is magnetizable, to a moving flexible substrate by means of a plurality of coater slots arranged in a block and fed from reservoirs, and magnetic recording media thus produced.

For the production of recording media which nowadays consist in general of a plurality of layers located one on top of the other, there is a large number of different coating processes which differ very greatly depending on the structure of the recording medium and on the part-layers required for producing such recording media. Thus, photographic recording media which may consist of more than ten layers are for the most part produced by means of cascade coaters or otherwise curtain coaters. In the case of a cascade coater, which is shown schematically in FIG. 1, a plurality of dispersions flowing one above the other run simultaneously over a downward-sloping surface to the run-off edge and are taken up by a substrate moving past vertically upward, the fluid bridge formed from the layers being stabilized by slightly reduced pressure below the run-off edge. In the case of a curtain coater, the individual dispersions extruded from a coater orifice fall individually in a curtain onto the substrate moving horizontally past and are thus applied one on top of the other.

There is a plurality of methods for the application of magnetizable layers whose dispersions generally have a substantially higher viscosity. A dispersion containing the finely divided magnetic pigments, which are finely distributed in a polymeric binder matrix, can be applied to the substrate by means of knife coaters, doctor blade coaters, gravure coaters, reverse roll coaters or extruder coaters. An extruder coater for simultaneous application of a plurality of layers located one on top of the other is disclosed in PCT application EP 93/02017. The dispersions are applied to a flexible substrate from at least two coater slots, the upper edge of the upper outlet orifice arranged in the direction of transport of the substrate being recessed with respect to the lower edge of the lower outlet orifice, and a right parallelepiped magnet whose upper edge is opposite the common outlet orifice of the coater slots and from 0.1 to 5 mm away being arranged behind the substrate and parallel thereto, and a stripper plate which is extended from the extruder edge toward the material web being mounted at the two coating edges in order to avoid thickening of the edges. FIG. 2 schematically shows the structure of such a coater, which in particular has the advantage that the applied amounts of dispersion are substantially independent of the distance of the outlet slots from the material web. Magnetic recording media produced using such coaters are disclosed in DE-A 42 34 608 and 42 43 846.

SUMMARY OF THE INVENTION

FIG. 3 shows schematically the structure of a double doctor blade coater. In the latter, two or more dispersions are applied from coater slots, which run essentially vertically upward and unite at the outlet point, onto a substrate which is drawn horizontally past and is guided by means of two rolls under a defined web tension over the convex coater head. The pressure of the dispersions fed to the substrate and in particular the shape of the run-off edge in the coating direction and the web tension of the substrate determine the thickness of the cast layers. Such multiple doctor blade coaters are disclosed in European patent applications 0 431 630, 0 452 959, 0 529 516, 0 537 778, 0 554 855, 0 557 769, 0 559 465, 0 566 124 and 0 593 957, U.S. Pat. Nos. 4,854,262 and 5,072,688 and DE 40 08 005. This coating process has the disadvantage that, as is evident from the above explanation, the locally applied amounts of dispersion may be highly dependent on the tension of the web freely stretched between the two rolls. Web fluttering which may occur and which is difficult to avoid particularly at high coating speeds causes sensitive coating defects which render the resulting product useless. Moreover, this coating process sets relatively high requirements with regard to maintenance of viscosities or flow limits of the part-layers, as is evident, for example, from the cited DE-A 40 08 005.

Finally, U.S. Pat. No. 4,863,793 mentions a coating apparatus which is shown schematically in FIG. 4. In this apparatus, the dispersions are applied from two coater slots, one of which is roughly horizontal and the other downward-sloping, to a substrate which is moved past on a coating roll. This coating apparatus differs from the double doctor blade coater shown in FIG. 3 in that here the material is cast onto a concave substrate.

In all the application processes discussed above, the average layer thickness is determined by the metering of the coating components.

Investigations by the applicant have shown that, in the production of multilayer magnetic recording media, a very technically complicated procedure is involved especially when the object is to cast a very thin, preferably magnetizable, layer whose thickness is less than 1 μm onto a lower layer which contains binder and nonmagnetic pigments.

It is an object of the present invention to provide a casting apparatus of the abovementioned type for the production of magnetic recording media which does not have the abovementioned disadvantages and in which it is also possible in particular to apply very thin magnetizable and/or nonmagnetizable layers, the local application being independent of the web tension and the viscosities and flow limits of the part-layers being capable of being chosen within wide limits.

We have found that these objects are achieved, according to the invention, by an apparatus of the generic type mentioned at the outset, the coater slots being arranged essentially parallel to one another in a multipart block and being fed from reservoirs whose direction of flow is parallel to the outlet orifice of the coater slots. The substrate is guided above or on a nonconvex surface which is preferably realized by means of a coating roll and which transports the layers to be coated. The outlet surfaces of the coater block which are opposite the web form, together with the web, a coating gap which, with the exception of the inflow surface, does not widen in the running direction of the web.

Further details of the invention are evident from the claims, the description and the drawings.

BRIEF DESCRIPTION OF THE DRAWINGS

FIG. 5a schematically depicts a section of a one-piece coating block with coating roll. FIG. 5b schematically depicts a section of a preferred embodiment of a coater in accordance with the invention. FIG. 6 schematically depicts an arrangement of a coater block having one reservoir and coating roll in perspective. FIG. 7 schematically depicts a longitudinal section of a part of a coating block.

DESCRIPTION OF THE PREFERRED EMBODIMENTS

Figure 5:
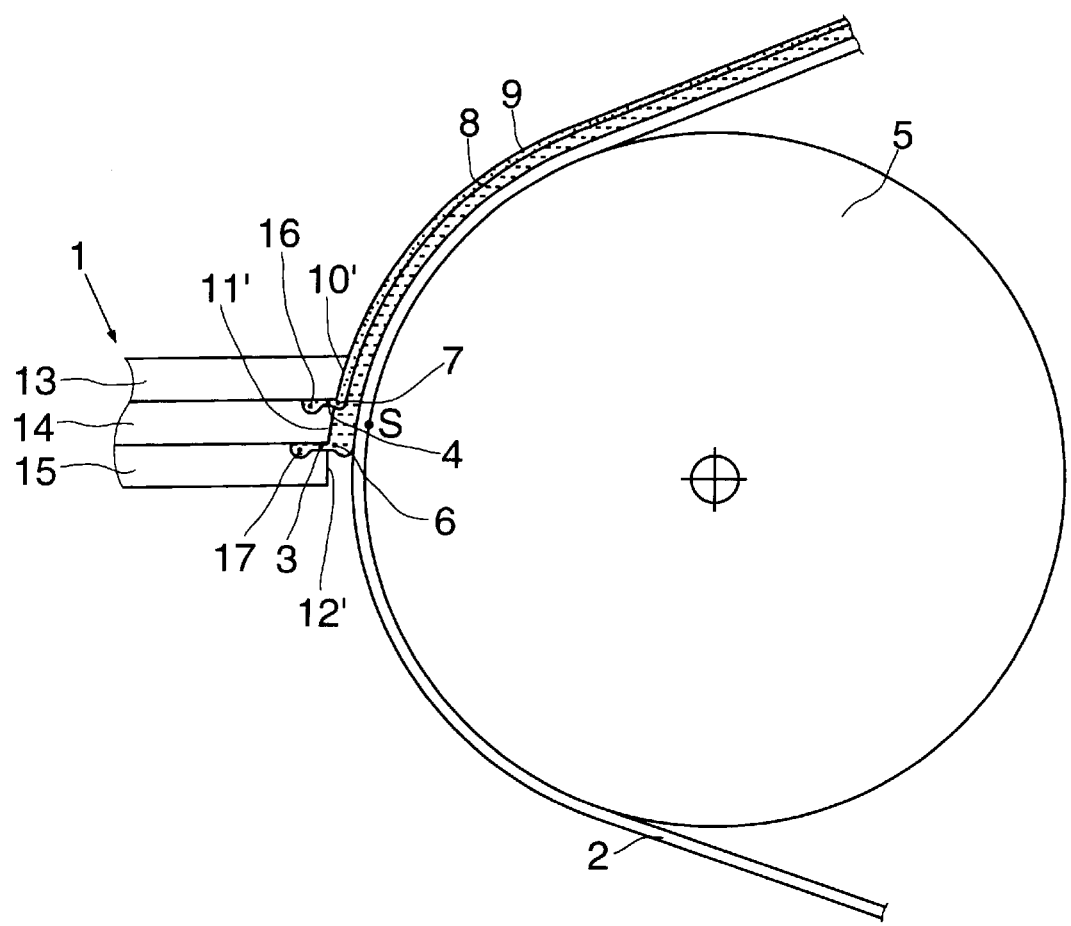
FIG. 5 schematically depicts a section of a double knife coater in accordance with the invention.
Figure 5C:
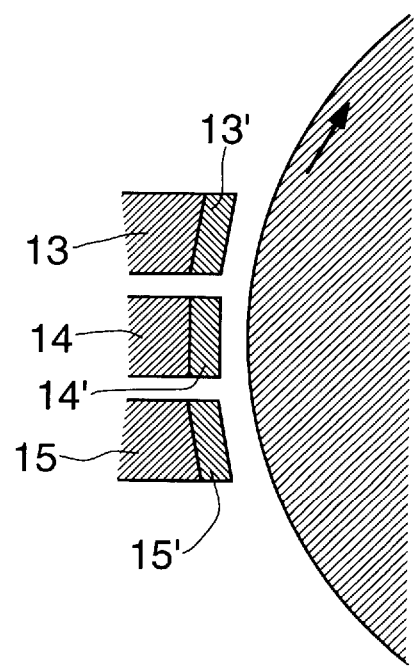
FIG. 5c schematically depicts a section of another preferred embodiment of a coater in accordance with the invention.

The invention is explained in more detail below with reference to FIGS. 5 to 7, FIG. 5 illustrating the invention with reference to a double knife coater. Multiple knife coaters by means of which more than two layers can be applied simultaneously are of course also possible according to the invention. Flexible substrate (2) running in the direction indicated by the arrow is guided, in the region of the coater block (1) over a concave support surface (22), preferably a part of the circumference of a rotatable coating roll (5) and leaves the circumference of the coating roll after passing the coater block. The coater block (1) is located opposite to, and a distance away from, the summit S of the coating roll (5). Said coater block consists essentially of the right parallelepiped parts (13, 14, 15), between which the coater slots (3, 4) for applying the lower (8) and upper layer (9), respectively, are located. These coater slots are essentially parallel to one another.

Figure 1:
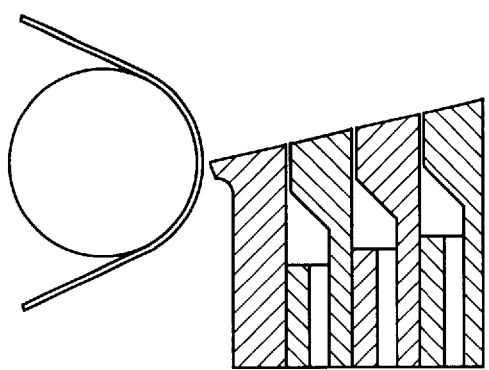
FIG. 1 schematically depicts a section of a conventional cascade coater.
Figure 2:
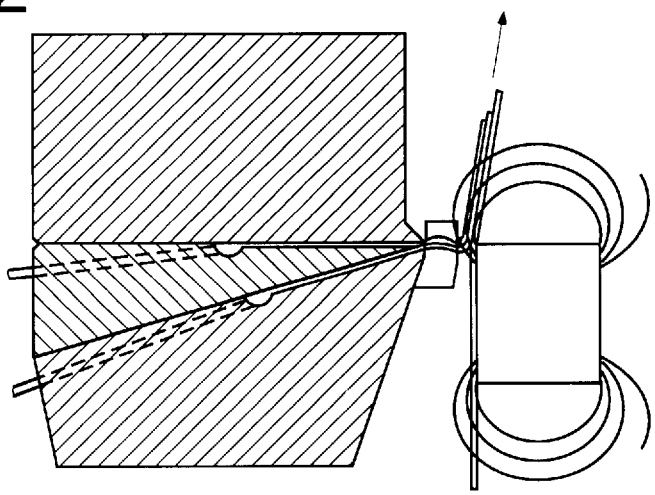
FIG. 2 schematically depicts a section of a conventional extrusion coater for two layers.
Figure 3:
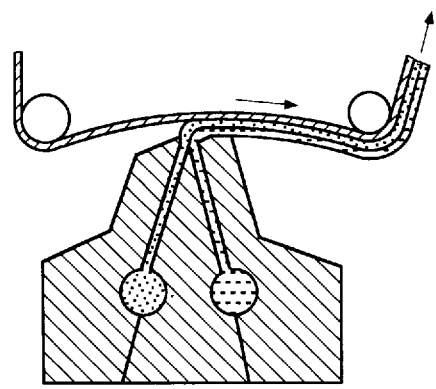
FIG. 3 schematically depicts a section of a conventional doctor blade coater for two layers.
Figure 4:
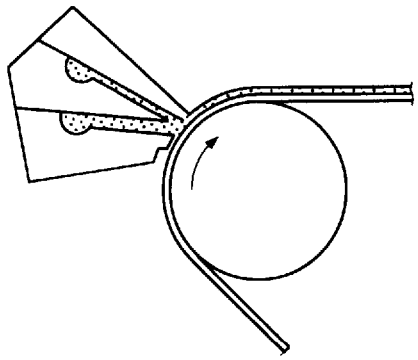
FIG. 4 schematically depicts a section of another conventional extrusion coater for two layers.

In contrast to the arrangement shown in FIG. 3 and disclosed in the prior art, the front surfaces (10, 11, 12) of the coater block (1) are, in a preferred form, not convex but concave and are adapted to the shape or surface (22) of the coating roll (5). Such an embodiment is shown schematically in FIG. 5a.

Another, likewise preferred form is shown in FIG. 5b. Here, the front surfaces (10', 11', 12') are linear and are arranged relative to the cylindrical circumference of the coating roll in such a way that their parallels form a tangent to the roll circumference (22), the contact points P, P', P" corresponding to the running direction of the coating roll or of the substrate, ie. the front edge (20) of the part-block (13) is a larger radial distance from the circumference (22) of the coating roll than the rear edge (21). Thus, each of the coater part-blocks (13, 14, 15) should not form a beak; this also applies to the arrangement according to FIG. 5a. An exception to this is the bottom inflow block (15).

Of course, the front surfaces (10, 10', 11, 11', 12, 12') of the coater block may also occur in mixed form, ie. the coater block may also have, for example, the configuration (10, 11', 12) or (10', 11, 12').

To permit the application of different layers, the horizontal distance of the block (1) from the circumference of the coating roll (5) as a whole is firstly continuously adjustable. Moreover, the terminating block (13), which limits the width of the coater slot (4) for the application of the upper layer, can also be separately horizontally adjusted so that the application of the upper layer is also individually and continuously adjustable. When approaching the knife coater, it is preferable if initially a larger distance is chosen between outlet orifices (6, 7) and the substrate (2) and, as explained in greater detail below, the coater slots (3, 4) are fed with dispersion from the reservoirs (16, 17) and, as soon as these layers are applied to the substrate, the spacings of the block (1) and of the part-block (13) are adjusted until the required layer thickness of the two part-layers (8, 9) is reached, so that this fine adjustment can take place while the web is running. Measuring methods for establishing the required layer thickness are disclosed in sufficient number in the prior art.

The feeding of the coater slots with dispersion is described below with reference to FIGS. 5, 6 and 7. The dispersion flows parallel to the extension of the outlet orifices (6, 7) through the cavity-like reservoirs (16, 17) having, for example, a circular space, as shown by the perspective FIG. 6 for one reservoir. A throttle valve (18) for regulating the flow rate and the system pressure in the coater slot (3) or (4) is present in the line (19) feeding the reservoir. The length of the coater slots (3, 4), ie. the distance between reservoir (16, 17) and outlet orifice (6, 7), may be from 10 to 70 mm.

The slot widths of the lower and upper outlet orifices (6, 7) are from 0.2 to 8 mm for the lower layer and preferably from 0.2 to 6 mm for the upper layer. The width (11) of the coating lip of the middle block (14) is from 0.5 to 3 mm, the length of the inflow surface (12) of the first part-block (15) is more than 2 mm and the length of the outflow surface (10) of the uppermost (final) block (13) is from 1 to 3 mm.

FIG. 7 shows a section through a block containing the reservoir (16, 17), in another version. The figure reveals that the cross-section of the reservoir narrows in the direction of flow in order thus to ensure a constant material flow through the coater slots (3, 4) in the direction of the outflow orifices (6, 7).

As stated above, it is in any case important that the coater does not form a beak, ie. the outlet surfaces of the coater block which are opposite the web form, together with the web, a coating gap which does not widen in the running direction of the web but advantageously becomes narrower. An exception to this is the inflow surface (12'). For example, the inflow gap is 15 μm and the outflow gap 10 μm. The radius of the upper and lower edges (20, 21) of the front surfaces (10, 10', 11, 11', 12, 12') should be as small as possible and may not be more than 100 μm. The diameter of the coating roll is in general from 100 to 700 mm. The distance from the support surface to the lower, or inflow edge (20) is equal to or greater than the distance from the support surface to the upper or outflow edge (21).

There are in principle no restrictions for the composition of the layer containing the magnetic pigments or of the nonmagnetic layer.

The magnetic pigments known from the prior art, such as iron oxide, Co-doped iron oxides, metal pigments and metal alloys, chromium dioxide and others, may be employed, and the conventional polymeric binders or binder mixtures and the other additives, such as dispersants, nonmagnetic pigments, lubricants, curing agents, wetting agents and solvents, may also be used.

Suitable components of the magnetic and of the nonmagnetic layer are described, for example, in DE-A 43 02 516.

Substrates used are known films of polyesters, such as polyethylene terephthalate or polyethylene naphthalate, and polyolefins, cellulose triacetate, polycarbonates, polyamides, polyimides, polyamidoimides, polysulfones, aramids or aromatic polyamides. The substrate may be subjected beforehand to a corona discharge treatment, a plasma treatment, a slight adhesion treatment, a heat treatment, a dust removal treatment or the like. In order to achieve the object of the present invention, the nonmagnetic substrate is one having a center line average value of in general 0.03 μm or less, preferably 0.02 μm or less, in particular 0.01 μm or less. Moreover, it is desirable for the substrate not only to have such a low center line average value but also not to have large projections (protuberances) of 1 μm or more. The roughness profile of the surface of the substrate can, if desired, be freely monitored (controlled) according to the size and amount of the filler which is to be added to the substrate. Examples of suitable fillers are oxides and carbonates of Ca, Si and Ti and fine organic powders of acrylic substances.

The process for the preparation of the magnetic dispersion comprises at least one kneading stage, one dispersing stage and, if required, one mixing stage, which may be provided before and after the preceding stages. The particular stages may each be composed of two or more stages. In the preparation of the composition, all starting materials, ie. the ferromagnetic powder, the binder, the carbon black, the abrasive, the antistatic agent, the lubricant and the solvent, may be added to the reactor at the beginning of the process or subsequently in the course of the process. The individual starting materials may be divided into a plurality of portions which are added to the process in two or more stages. For example, the polyurethane is divided into a plurality of portions and added in the kneading stage and in the dispersing stage and also in the mixing stage for adjusting the viscosity after dispersing.

In order to achieve the object of the present invention, a known conventional technology may also be used as part of the process for the production of the novel magnetic recording medium. Thus, a kneading apparatus having a high kneading force, such as a continuous kneader or a pressure kneader, may be used, for example in the kneading stage, in order to obtain a novel magnetic recording medium having a high Br value. If such a continuous kneader or pressure kneader is used, the ferromagnetic powder is kneaded with the total amount of binder, preferably 30% by weight or more. For example, 100 parts by weight of a ferromagnetic powder are mixed with from 15 to 500 parts by weight of a binder.

After fine filtration through narrow-mesh filters having a mesh size of not more than 5 μm, the dispersions are applied by means of the novel apparatus at speeds in the usual range of 100–500 m/min, oriented in the recording direction in a magnetic field and then dried and subjected to a calender treatment and, if required, a further surface-smoothing treatment.

The magnetic recording medium thus obtained is then slit longitudinally or punched to give the usual width for use and is subjected to the conventional electroacoustic tests and the mechanical tests.

As stated at the outset, particularly advantageous results are obtained with the novel apparatus when a very thin magnetic upper layer whose layer thickness is less than 1 μm is to be cast on a nonmagnetic lower layer whose layer thickness may be 1–8 μm.

It was found, surprisingly, that the ranges of the viscosity η and of the flow limit τ of the upper layer (UL) and of the lower layer (LL) and their ratios can be varied within very wide limits without coating technology problems being encountered.

The following ranges were found to be advantageous for the flow limit:

$$\tau_{LL} = 0.5 - 80 \text{ Pa}$$

$$\tau_{UL} = 2 - 30 \text{ Pa}$$

$$\frac{\tau_{LL}}{\tau_{UL}} = 0.6 - 10$$

With regard to the viscosities η, the ranges in which satisfactory coating could be achieved were as follows:

$$\eta_{LL} = 30 - 100 \text{ mPa.s}$$

$$\eta_{UL} = 5 - 70 \text{ mPa.s}$$

$$\frac{\eta_{LL}}{\eta_{UL}} = 1 - 10$$

The novel apparatus is described below by way of example with reference to double layers for the production of a magnetic recording medium for high-density digital recording.

EXAMPLE 1

| a) Composition of the lower layer (8) | Parts by weight |
|---|---|
| Vinyl polymer having polar groups | 85 |
| Polyurethane having polar groups | 85 |
| TiO$_2$ (55 m$^2$/g BET) | 1000 |
| Lubricant | 25 |
| Polyisocyanate | 30 |
| Solvent (Tetrahydrofuran, dioxane) | 2209 |

The viscosity of this lower layer (8) is 50 mPa.s and the flow limit is 18 Pa.

| b) Composition of the upper layer (9) | Parts by weight |
|---|---|
| magnetizable metal pigment (H$_c$ = 150 kA/m, BET = 56 m$^2$/g) | 1000 |
| α-Al$_2$O$_3$ (particle size = 0.2 μm) | 70 |
| Vinylpolymer having polar groups | 77 |
| Polyurethane having polar groups | 77 |
| Phosphoric ester | 10 |
| Lubricant | 25 |
| Polyisocyanate | 22.5 |
| Solvent (tetrahydrofuran, dioxane) | 6170 |

The viscosity of this upper layer (9) is 2.5 mPa.s and the flow limit is 8 Pa.

The viscosity and the flow limits were measured using a Carri-Med CSL rheometer with the cone-and-plate measuring system at 25° C. and the evaluation was carried out according to Bingham (downward curve).

Using these dispersions of the stated composition, a double layer (8, 9) is then cast at a coating speed of 200 m/min from the two coater slots on to a roughly 6 μm thick substrate consisting of polyethylene terephthalate, it being possible to achieve a minimum dry layer thickness of up to 1.5 μm for the lower layer and a minimum dry layer thickness of up to 0.1 μm for the upper layer. A stripe-free coating without a mixing zone between the upper and lower layer was obtained.

EXAMPLE 2 a) The composition of the lower layer was as in Example 1

| b) Composition of the upper layer | Parts by weight |
|---|---|
| Magnetizable metal pigment ($H_c$ = 120 kA/m, BET = 50 m$^2$/g) | 1000 |
| α-Al$_2$O$_3$ (particle size = 0.3 μm) | 110 |
| Vinyl copolymer having hydroxyl groups | 75 |
| Acrylate copolymer having carboxyl groups | 50 |
| Polyurethane | 75 |
| Phosphoric ester | 5 |
| Lubricant mixture | 30 |
| Polyisocyanate | 35 |
| Solvent (tetrahydrofuran, dioxane) | 2850 |

Flow limit $\tau$=25 Pa

Viscosity $\eta$=55 mPa.s

With this composition, too, it was possible to achieve satisfactory coating up to layer thicknesses of 1.5 μm for the lower layer and 0.1 μm for the upper layer.

EXAMPLE 3

Using compositions for the lower and the upper layer as in Example 2, the following rheological data were obtained by varying the amount of solvent:

LL: $\eta$=72 mPa.s, $\tau$=16 Pa

UL: $\eta$=55 mPa.s, $\tau$=25 Pa

The coating results were as in Examples 1 and 2.

We claim:

1. An apparatus for simultaneous application of a plurality of fluid materials onto a moving flexible substrate to form a plurality of layers thereon, at least one of the fluid materials is magnetizable, the apparatus comprising:

a multipart coater block consisting essentially of at least three block parts, each of said block parts having a front surface facing the moving flexible substrate, said coater block having a plurality of coater slots which are essentially parallel to one another, each of said coater slots having a outlet orifice and being fed with the fluid material from a respective one of a plurality of reservoirs, wherein the direction of flow of the fluid materials through the reservoirs is parallel to the direction of flow of the fluid materials to the outlet orifices, each of said outlet orifices being formed in a gap between said front surfaces of said at least three block parts, the moving flexible substrate traveling past said coater block in a direction of travel such that the fluid materials in the outlet orifices being transported from said coater block and onto the moving flexible substrate to form the plurality of layers thereon, said outlet orifices being arranged essentially opposite the summit of a convex surface of a cylindrical support over which the moving flexible substrate travels, said outlet orifices being longitudinal in a direction essentially perpendicular to the direction of substrate travel, wherein at least one of said front surfaces is of concave shape adapted to the convex shape of the cylindrical support and one of said front surfaces is linear, and wherein said front surface bounding the last of said outlet orifices with respect to the direction of substrate travel has an inflow edge and outflow edge, said outflow edge being upstream from the inflow edge with respect to the direction of substrate travel, distance between said inflow edge and the convex surface of the cylindrical support being equal to or greater than that between said outflow edge and the convex surface of the cylindrical support.

2. The apparatus of claim 1 wherein the reservoirs have a throttle valve for controlling the flow rate of fluid materials to the reservoirs.

3. The apparatus of claim 1, wherein the cross-section of each reservoir tapers conically in the direction of flow of the fluid material in said coater block.

4. The apparatus of claim 1, wherein the radial distance of said coater block from the cylindrical support is as a whole adjustable.

5. The apparatus of claim 1, wherein the radial distance of the last of said at least three block parts in the direction of substrate travel, which bounds the last outlet orifice of the coater slots is separately adjustable in the radial direction to the cylindrical support.

* * * * *